United States Patent [19]

Ritzerfeld

[11] 4,026,646
[45] May 31, 1977

[54] ELECTROSTATIC OR XEROGRAPHIC COPYING OR DUPLICATING MACHINE

[76] Inventor: Gerhard Ritzerfeld, Schorlemer Allee 14, 1000 Berlin 33, Germany

[22] Filed: Jan. 19, 1976

[21] Appl. No.: 650,239

[30] Foreign Application Priority Data

Sept. 17, 1975 Germany .......................... 2541849

[52] U.S. Cl. ..................................... 355/7; 355/75
[51] Int. Cl.$^2$ ....................................... G03G 15/00
[58] Field of Search ................. 355/7, 3 R, 40, 75; 271/266, 267

[56] References Cited

UNITED STATES PATENTS

| | | | |
|---|---|---|---|
| 3,620,618 | 11/1971 | White | 355/7 X |
| 3,627,411 | 12/1971 | Nagel | 355/75 X |
| 3,669,536 | 6/1972 | Scott | 355/75 X |
| 3,880,521 | 4/1975 | Eppe et al. | 355/40 |

Primary Examiner—R. L. Moses

Attorney, Agent, or Firm—Michael J. Striker

[57] ABSTRACT

The machine is of the type in which originals to be copied or duplicated are laid face down upon a transparent support plate to be illuminated by copying light. A transport arrangement effects continuous or intermittent line-by-line transport of a multi-line original in direction transverse to the direction in which the lines on the multi-line original extend. The transport arrangement includes an advancement mechanism located at one of the two ends of the transparent support plate which extend transverse to the transport direction, a motion-transmitting structure connected to the advancement mechanism and extending from the latter to a position overlying the transparent support plate, and holding devices on the end of the motion-transmitting structure remote from the advancement mechanism for holding the transverse end of a multi-line original to be shifted line-by-line across the transparent support plate.

30 Claims, 5 Drawing Figures

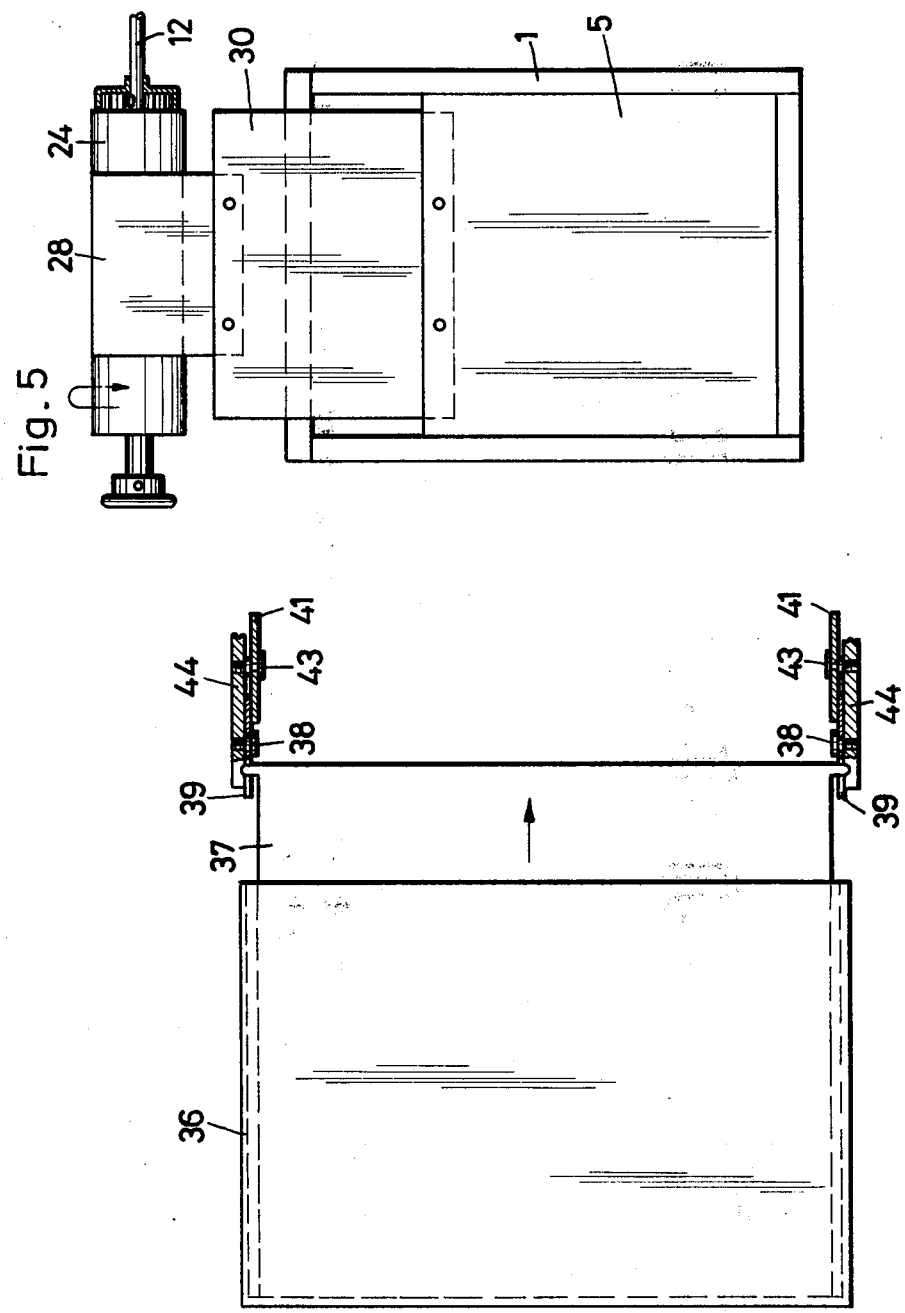

ELECTROSTATIC OR XEROGRAPHIC COPYING OR DUPLICATING MACHINE

BACKGROUND OF THE INVENTION

The invention relates to copying and duplicating work.

More particularly, the invention relates to the use of electrostatic or xerographic copying or duplicating machines, especially of the type in which the originals to be copied are laid face down upon a transparent support plate to be illuminated by copying light.

I have already considered the possibility of providing copying machines with masks defining line-unblocking slits and shifting a multi-line original laid on top the masks linewise, to unblock successive lines of the original for successive copying operations. The slit-defining masks may be plain white cover-over masks or may be provided with inscriptions or the like. With the possibilities already considered by me, the arrangement which effects the line-by-line advancement of the multi-line original relative to the line-unblocking slit includes holding means. These holding means are located along those edges of the transparent support plate which run transverse to the line direction, i.e., parallel to the direction in which the step-by-step advancement mechanism shifts the multi-line original from one copying operation to the next.

Depending upon the variety of factors, including the design of the copying machine which is to be provided with the step-by-step advancement mechanism accessory for shifting multi-line originals, and also including other spatial considerations such as the size and shape of the multi-line originals to be handled, such a disposition for the holding means for the multi-line originals and the various masks may be unsuitable. This is irrespective of whether the step-by-step advancement mechanism for shifting multi-line originals and/or the mechanism for interchanging masks from an inseparable part of the copying machine or are removably mounted accessories, for example of the type purchased by a customer months after the purchase of the copying machine proper, when his particular copying needs have become clearer to him.

SUMMARY OF THE INVENTION

It is accordingly one, very general object of the invention to provide means for effecting step-by-step shifting of multi-line originals and/or automatic selection of masks of different types, so designed that the holding means for the originals and/or masks need not extend along the edges of the transparent support plate running parallel to the transport direction of the multi-line originals.

It is another object of the invention to provide a copying machine of the type in question with means for effecting step-by-step shifting, automatic selection and positioning, and other such operations involved in complicated copying procedures, in a way which involves an ingenious and more efficient use of space in general.

It is an object ancillary to the above to provide a copying machine with means of the type in question of novel mechanical construction and operating in a novel manner, so that the different utilization of space may be achieved.

Other objects, involving the utilization of space and the use of novel combinations of motion-transmitting mechanisms, and the like, will be explained in conjunction with the detailed description, below, of preferred embodiments.

The preferred embodiment of the invention involves a copying machine of the type having a transparent support plate on which originals and masks bearing information to be copied are laid face down to be illuminated by copying light.

The advancement mechanism for effecting the step-by-step or line-by-line shifting of the multi-line original on the transparent support plate is located alongside one of those two ends of the support plate which run parallel to the ine direction — i.e., which run transverse to the direction in which the multi-line originals are shifted by the line-by-line advancement mechanism.

The line-by-line advancement mechanism of the preferred embodiment includes a plate-like and/or a belt-like component arranged at least in part above the transparent support plate, extending above and beyond a further original provided in addition to the multi-line original. The end of the plate-like and/or belt-like component remote from the remainder of the line-by-line advancement mechanism is provided with securing means for connecting such end to one end of the multi-line original to be shifted. The securing means may for example comprise clamps, holding pegs down onto which perforations on the multi-line original can be pushed, or the like. The other end of the plate-like and/or belt-like component is connected to the remainder of the step-by-step advancement mechanism and transmits the step-by-step motion-imparting force to the multi-line original to be shifted, so that the latter will be properly shifted relative to the line-unblocking slit and the various other originals and/or masks.

Preferably, the apparatus is so constructed that the space intermediate the orginals and the transparent support plate can be occupied by transparent but inscribed masks and plain and/or inscribed opaque cover-over masks, with such masks being held in well-defined positions by means of holding devices, edge stops and the like. The line-unblocking slit through which successive line or groups of lines of the multi-line original appear for copying purposes may be provided in one supplemental original or in one mask, or may be defined by two adjoining but spaced inscribed and/or plain opaque masks.

The aforementioned plate-like and/or belt-like component is advantageously entirely or in part flexible. This flexible component, at the end thereof remote from the securing means to which the multi-line original is connected, is connected to the remainder of the step-by-step advancement mechanism by means of an intermittently turned shaft, drum, or the like, onto which the component is wound step-by-step. Preferably the component in question is stiff enough that, upon reverse turning of the shaft or drum, the component winds off and moves back to its starting position.

Alternatively, the holding means, e.g., clamps, hand-on pegs, or the like, for the multi-line original can be provided on one end of an entirely rigid plate, made for example of sheet metal or a hard synthetic plastic. The other end of the rigid plate can be connected to one of one or more flexible belts, or the like, made for example of iron, another metal, or a flexible synthetic plastic. The other end of the flexible belt or belts can be secured to a rotating shaft, drum, or the like, driven by the intermittent-motion components of the step-by-step advancement mechanism. In this way, the flexible belt or belts will be wound onto such rotating component, step-by-step, during the line-by-line advancement of the multi-line original. The belts, although flexible, are preferably stiff enough that, upon reverse turning of the shaft or drum, the belts can drive the rigid plate back to its starting position.

As a final possibility, the connection between the holding means and the motion-generating means of the step-by-step advancement mechanism can be established by providing the plate, or the like, carrying the holding means with a row of teeth or perforations interengaged with a row of perforations or teeth, or the like, on part of the motion-generating means.

Preferably the step-by-step advancement mechanism, or more specifically its step-motion-imparting electromagnet or other drive means, is synchronized in its operation with the motion of a cyclically moving part of the copying machine, for example the moving lamp-mirror combination of certain copying machines or the rotating selenium drum or other copying machines. For example, each time such a selenium drum reaches a preselected angular position it can trip a switch which effects brief energization of the step-motion-imparting electromagnet, or the like.

Shifted into position above or beneath the transparent support plate, selectable, are inscribed transparent and plain and inscribed opaque masks. Different such masks or combinations of such masks can be moved systematically into the copying position for use during the performance of a predetermined number of copying operations each, of for more complex preselected series of groups of copying operations, or the like. These various masks can be contained in a magazine and pulled out by suitable means, and/or they can be provided successively on one or more rolls of transparent, opaque, or alternately transparent and opaque material which is transported into the copying position by suitable control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a top view looking down upon the arrangement shown in FIG. 4.

DESCRIPTION OF THE PREFERRED EMBODIMENTS

Figure 1:
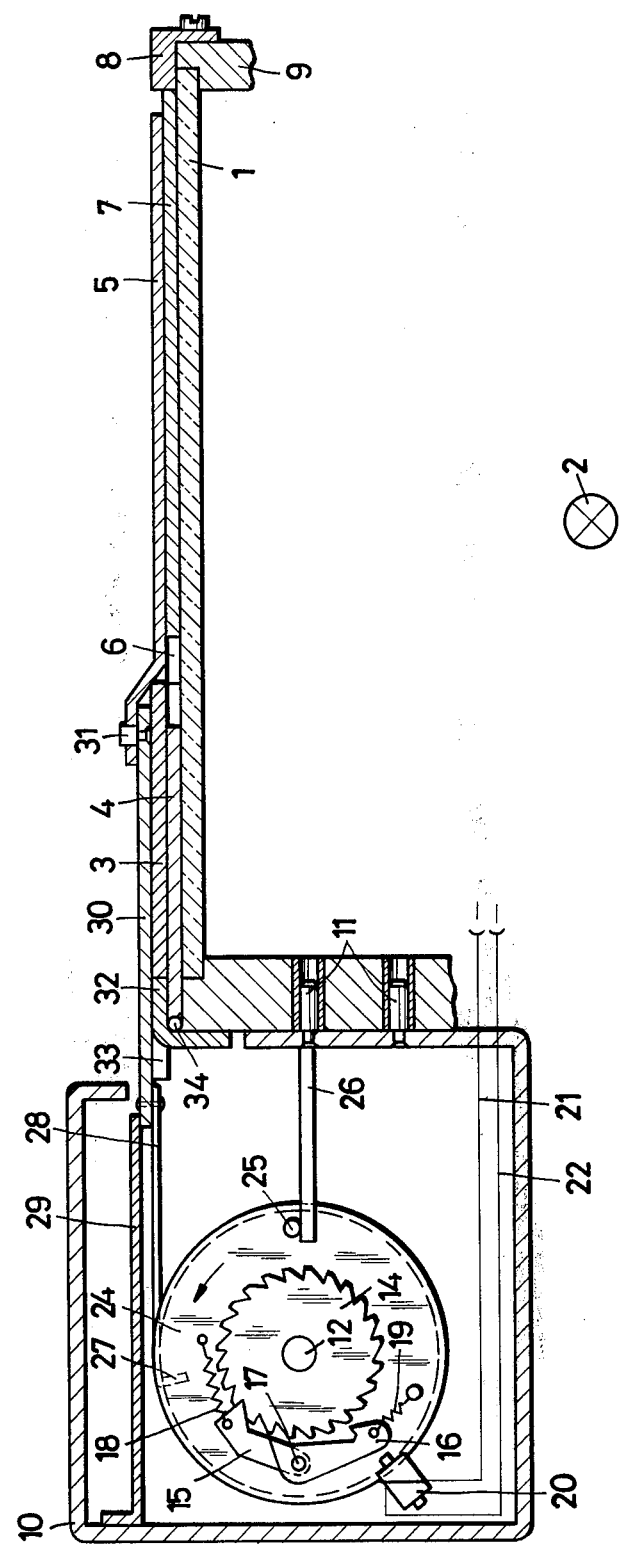
FIG. 1 is a section through a transport apparatus for effecting line-by-lne transport of a multi-line original, showing the various originals and masks employed, as well as the means for effecting step-by-step motion.
Figure 2:
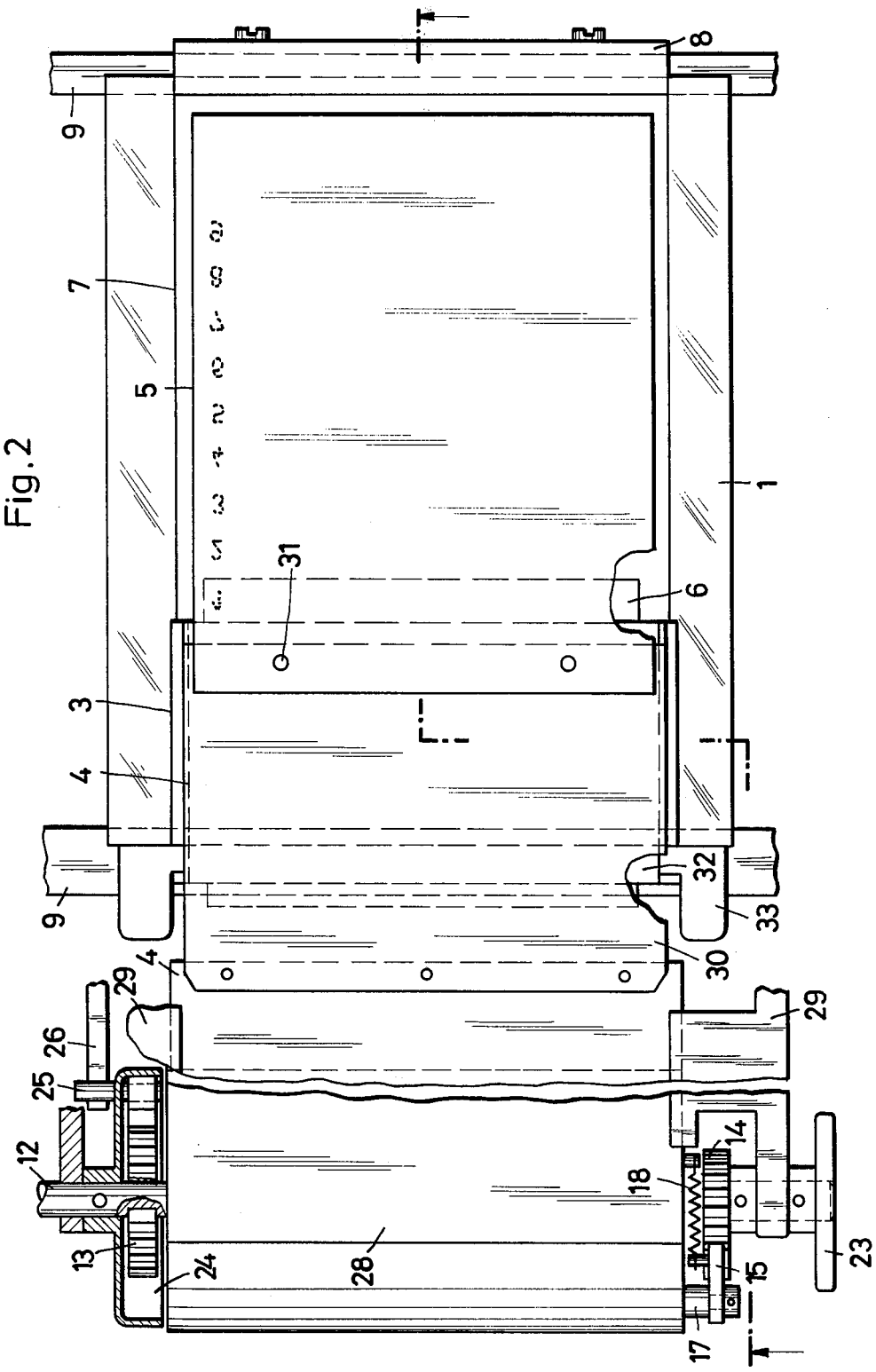
FIG. 2 is a view looking down upon the top of the apparatus shown in FIG. 1.

FIGS. 1 – 5 depict a single arrangement, but attention is directed first to FIGS. 1 and 2.

Numeral 1 denotes the transparent support plate of a copying machine provided with a light source 2. Light source 2, in per se conventional manner, is moved below and parallel to support plate 1, in order to illuminate successive portions of the originals and/or masks resting on the support plate 1. The materials to be illuminated include, in particular a heading original 1, an inscribed transparent mask 4, and finally that section of the multi-line original 5 which shows through slit 6. Slit 6 is defined jointly by the heading original 3 and the mask 7. Mask 7 has a lower surface which is light-reflective; it may be plain (i.e., blank) or it may like mask 4 bear inscribed matter. Mask 7 at its right end abuts against, and is accordingly properly positioned by, a stop 8 which is fixedly secured to the housing 9 of the copying machine.

Heading original 3 may, for example, bear printed matter which is to be reproduced upon every copy, for example the name of a firm, a set of instructions which applies to all the copies which are to be produced, etc. In constrast, inscribed transparent mask 4 may, for example, bear printed form material which is to be printed upon many successive copies but which is to be changed more often than the printed matter of heading original 3. For example, mask 4 may bear the date. Finally, multi-line original 5 bears a plurality of lines which are made to appear successively through the slit 6. Each line may constitute one unit of information, or each group of two, three, or another number of lines may constitute one unit of information to be reproduced upon one copy. Each line may contain a different item on an order invoice, the name and address of a different person, or any such variable information. It is to be understood that the examples just given concerning the printed matter on originals 3 and 5 on mask 4 are exemplary only, and that a very great variety of ultimate uses, and accordingly, types of informaton, could be involved when the illustrated apparatus is being employed.

The multi-line original 5, the lines of which extend in the direction of elongation of slit 6, is mounted for shifting movement in direction transverse to the line direction. In this way, one or more lines on the multi-line original 5, depending upon the breadth of slit 6, together with the printed material on heading original 3, inscribed mask 4 and/or mask 7, will be illuminated and copied. To effect the line-by-line shifting of the multi-line original 5, the latter is connected to a step-by-step advancement mechanism. This mechanism is arranged in a housing 10 removably mounted on the housing 9 of the copying machine, for example by means of guide pins 11. If desired, the housing 10 could constitute the housing for a removable accessory unit to be attached to an existing copying machine. In FIG. 2 the housing 10 is omitted, for the sake of clarity.

The per se conventional step-by-step advancement mechanism is essentially comprised of a ratchet wheel 14 rotatable about a shaft 12, a spiral torsion spring 13 acting upon the ratchet wheel 14, a blocking pawl 15 and an advancement pawl 16. The two pawls are pivotable as one about a pin 17 and are held in their illustrated position by respective springs 18 and 19. Brief energization of an electromagnet 20 effects movement of the pawls 15 and 16 such that the ratchet wheel 14, is driven by the spiral spring 13 in the direction of the arrow through one step, corresponding to the angular tooth pitch. As a result of this one-step advancement of the ratchet wheel 14, the multi-line original 5 is shifted leftward by a distance corresponding to, for example, one line, as a result of the provision of a connection to be described below.

Electromagnet 20 receives energizing current via lines 21 and 22, which are connected by means of plug-and-socket connectors with current supply lines inside the housing of the copying machine proper. Preferably, the energization of electromagnet 20 is effected using discrete, well-defined current pulses, each corresponding to a one-line advancement of the multi-line original, to make it possible to easily select whether the multi-line original is to be advanced leftward in steps of one line or in steps of more than one line. Advantageously, the generation of such well-defined current pulses is accomplished using a mechanical component of the copying machine which always performs the same mechanical movement during each successive copying operation; for example, use could be made of the moving lamp-mirror device, or the rotation of the selenium drum, if one is present, could be utilized for purposes of synchronization.

The ratchet wheel 14 can be reset, i.e., turned in direction opposite to that indicated by the arrow, by means of a rotary knob 23; pawls 15 and 16 do not block such resetting motion. Such resetting also serves to rewind the spiral spring 13. The reset turning can proceed until, for example, a in 25, provided on a drum 24 connected with ratchet wheel 14, reaches a stop 26 mounted on the housing 10. Alternatively, the reset turning could be effected not by hand, but instead automatically or semi-automatically by means of an electric motor connected with shaft 12 via a clutch.

To establish a motion-transmitting connection between multi-line original 5 and the step-by-step advancement mechanism, the drum 24 is provided with a slit 27 into which is inserted and clamped the end of a flexible belt 28. Belt 28 becomes wound onto drum 24 as drum 24 turns in the direction of the arrow. Located above the belt 28, alongside its opposite lateral edges, are two guide rails 29. Rails 29 provided to maintain in a horizontal position that portion of the belt 28 not wound on drum 24. Secured to the right-hand end of belt 28 is a rigid plate 30, made for example of metal or of hard synthetic plastic material. Pins 31 are fixedly mounted on the right-hand end of rigid plate 30. The leading (left) end of multi-line original 5 is provided with holes through which the pins 31 project.

A motion-transmitting connection between multi-line original 5 and the step-by-step advancement mechanism is established by pushing the perforated leading end of original 5 over and onto the holding pins 31. When ratchet wheel 14 and accordingly drum 14 turn in the direction of the arrow, multi-line original 5 will be pulled leftward; when the ratchet wheel and drum turn in the opposite direction, original 5 will be pushed back toward the right. Belt 29 is made of a material stiff enough that, when it winds off the drum 24, it will not bulge upward or downward, but will instead transmit motion along its length. The rigid plate 30 could be omitted if the belt were made longer and itself provided with the holding pegs 31.

Likewise, instead of clamping the left end of belt 28 in the slit in drum 24, the belt could be held on the drum by other means, for example, by providing the belt with a row of teeth of perforations interengaged with corresponding teeth or perforations in the drum.

The multi-line original 5 can be pulled to the left to such an extent, possibly even into the housing 10 itself, as to assure that the lowermost line (rightmost portion in FIG. 1) on the original 5 can be brought into register with slit 6. The distance between the drum 24 and the housing 9 may be selected in accordance with the expected maximum length of multi-line originals 5.

The stop for the heading original 3 is constituted by a clamping bar 32 for the inscribed mask 4. Manipulation of the keys 33 causes the claming bar 32 to swing upward about the shaft 34, to release the inscribed mask 4 and make possible the substitution of another such mask. The inscribed mask 4 and the mask 7 could in certain circumstances be a single component having transparent portions in the region of slit 6 and also beneath the heading original 3.

The entire arrangement of originals and masks can be covered over, from above, by a swinging flat or lid made of flexible material, for example.

Figure 3:
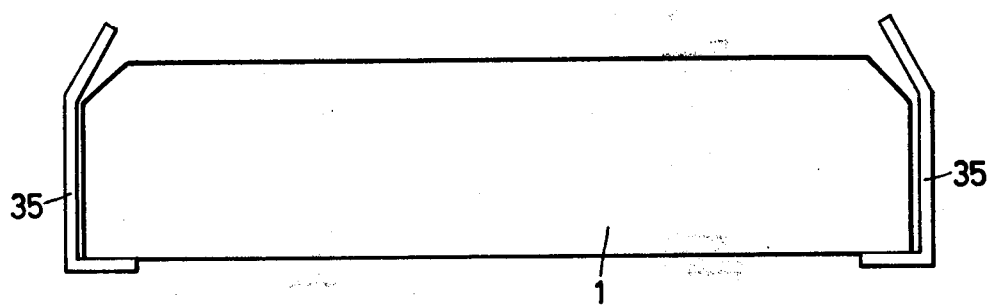
FIG. 3 depicts the clamping means employed for holding originals and masks in place on the transparent support plate of the copying machine of FIG. 1.

FIG. 3 depicts the manner in which the originals and masks are secured on the transparent support plate 1 along the edges thereof running transverse to the lines on multi-line original 5. To this end, the support plate 1 is chamfered along these edges. Arranged at an acute angle to the sloping chamfers and ruuning along the edges in question are holding strips 35, made for example of metal. The edge portions of the originals and masks inserted between the chamfers of support plate 1 and the hodling strips 35 are held in place by a clamping action, so that they will be reliably positioned and incapable of slipping.

Figure 4:
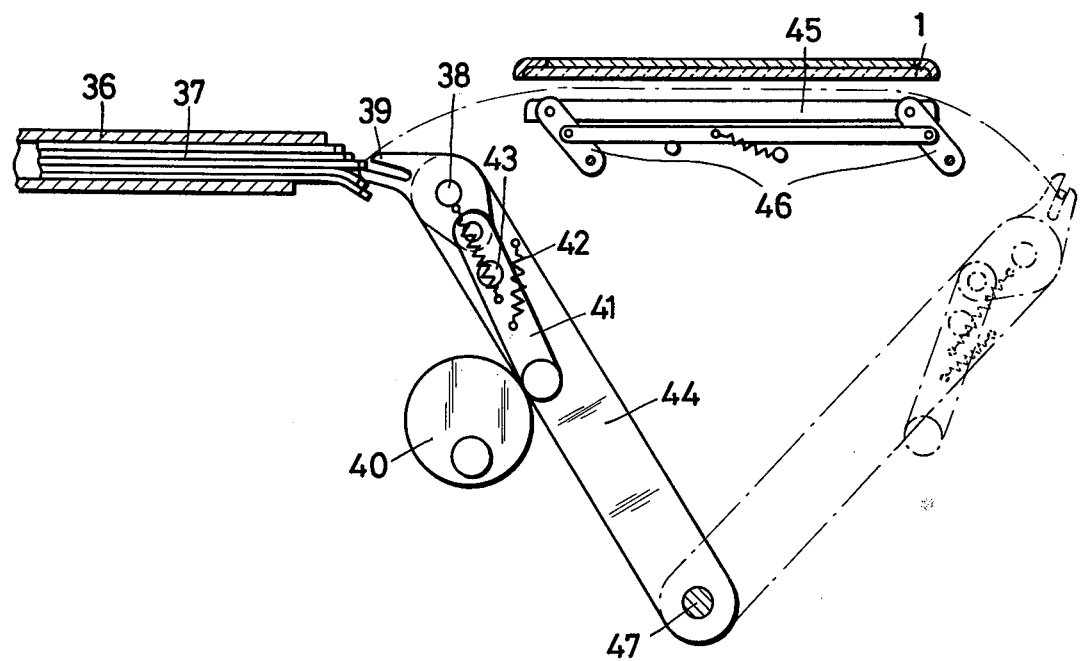
FIG. 4 depicts an arrangement for the selection of inscribed transparent and plain and inscribed opaque masks and their proper positioning on the transparent support plate, the arrangement including a magazine from which individual masks are pulled out.

FIGS. 4 and 5 depict a magazine 36 containing masks 37 some of which may be inscribed transparent masks and others opaque cover-over masks. Each mask 37 can be individually selected, pulled out of the magazine 36 and transported into a proper position below the transparent support plate 1. After one or several copying operations, one such mask can be replaced by another. These transparent and/or opaque inscribed and-/or plain masks 37 can be employed in addition to or instead of the inscribed transparent mask 4 and opaque cover-over mask 7 of FIGS. 1 and 2.

Arranged in front of the projecting ends of the masks 37 stored in magazine 36 is a pair of grippers 39, mounted for swinging movement about a pivot shaft 38 and each arranged alongside one lateral edge of the masks 37. The position of the gripper 39 is determined by an eccentric disk 40. Eccentric disk 40 causes a lever 40, coupled to the gripper 39, to swing about a pivot pin 43 against the opposition of a biasing spring 42. By changing the position of eccentric disk 40, it is possible to cause the gripper 39 to be brought into a position alongside the end of any selected one of the masks 37.

The arrangement comprised of gripper 39 and lever 41 is mounted on a guide lever 44. After the gripper has been set to the selected position, the guide lever 44 is swung clockwise about a pivot rod 47 into the dash-dot-line position of FIG. 4. As the lever 44 leaves the solid-line position of FIG. 4, the gripper 39 moves away from eccentric disk 40 and, in so doing, tilts about pivot shaft 38 to grip and pull the end of the selected mask 37. As the guide lever 44 continues to move clockwise, the selected mask 37 is pulled into a position intermediate the transparent support plate 1 and a transparent plate 45 arranged beneath plate 1 parallel thereto, with the selected mask 37 exactly assuming the copying position as the lever 44 reaches its end position.

Transparent plate 45 is carried by swingably mounted levers 46. After the selected mask 37 has been properly inserted between plates 1 and 45, mounted levers 46 are swung over, so as to cause plate 45 to press the selected mask 37 upward against the bottom of transparent support plate 1. One or more copying operations are then performed. If the selected mask 37 is now to be replaced by a different one, then the selected mask 37 is slid back into the magazine 36 by swinging the guide levers 44 back to their starting position, and the newly selected mask 37 is then inserted between transparent plates 1 and 45 in the manner just described.

It is possible to provide programmable control means for selecting the sequence in which different masks are to be moved into the copying operation and the number of copies to be run off using each mask. For example, since each different position of the eccentric disk 40 corresponds to a different mask 37, the eccentric disk 40 could be set using a conventional positioning (servo) system responsive to a signal whose magnitude is indicative of the desired position for disk 40. A simple electromagnet mover can be used to swing guide levers 44 from their solid to dash-dot-line positions. A counter can be used for counting the number of copies produced using a given mask, with the counter being automatically reset upon an exchange of mask, with the count being continually compared by a comparator against a preselected number. The establishment of the preselected sequence of operations can be accomplished very simply using a conventional step-by-step programmer. For step No. 1 the operator selects the mask (e.g., mask No. 6) to be used by moving a dial, associated with step No. 1, to the No. 6 position; the dial can be connected to a rotary potentiometer for generating a signal whose magnitude corresponds to the eccentric-disk-position associated with the selected mask. when the step-by-step-program begins to run, the No. 6 mask will be immediately installed in place. Also associated with step No. 1 can be a dial for selecting the number of copies to be made using the No. 6 mask; this dial could generate a signal which would be applied to the comparator. A second pair of such dials would be associated with step No. 2, one dial for selecting the mask to be used during step No. 2 and the other dial for selecting the number of copies to be made with such mask. The number of pairs of such dials depends upon the number of steps expected in such a program. The multi-line original 5 could be shifted by one line after each step. Alternatively, there could be associated with each step of the step-by-step programmer, a switch which would be manually set when it is desired that the multi-line original 5 be shifted in response to each individual copying operation. The operation of a step-by-step programmer of the type in question is, in respects other than those just mentioned, entirely conventional and does not require further explanation.

The use of a magazine containing discrete, individual masks is but one possibility. Alternatively, use could be made of a long web of mask material wound between supply and take-up reels and extending intermediate such reels through the space between transparent plates 1 and 45. The long web of mask material would be composed of a plurality of different masks, for example some of which are entirely opaque and plain, some of which are opaque but bear written inscriptions or the like, some of which are transparent and bear inscriptions or the like, some of which are transparent but include small opaque portions for blanking out certain information on other masks or originals, etc. By turning one or the other of the take-up and supply reels, any one of the masks on the web could be moved into the copying position intermediate places 1 and 45.

The control of the selection of such masks, whether they be pulled out of a magazine or moved into copying position by transporting a long web through the copying position, is preferably performed in dependence upon the step-by-step transport of the multi-line original 5. In this way, the lines of the multi-line original to be illuminated and copied during successive copying operations can be most systematically coordinated with the selection of one or more masks of different types, for example according to pre-established programs involving preselected combinations of masks and specified lines of information, or the like.

It will be understood that each of the elements described above, or two or more together, may also find a useful application in other types of constructions differing from the types described above.

While the invention has been illustrated and described as embodied in an arrangement for coordinating the linewise shifting of multi-line originals to be copied with the selection and positioning of transparent and/or opaque masks used in conjunction with a copying machine of the type in which the material to be copied is illuminated, it is not intended to be limited to the details shown, since various modifications and structural changes may be made without departing in any way from the spirit of the present invention, Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines of the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the motion-transmitting structure comprises a flexible plate-shaped member having one end connected to the advancement mechanism and provided on its other end with the holding means.

2. In combination with an electrostatic or xerographic copying of duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the motion-transmitting structure comprises at least one belt member having one end connected to the advancement mechanism and provided at its other end with the holding means.

3. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including means for holding transparent and opaque plain and inscribed masks in predetermined positions intermediate the multi-line original and the transparent support plate.

4. The combination defined in claim 3, the means for holding the masks including means for clamping masks in place.

5. The combination defined in claim 3, the means for holding the masks including edge stops for defining the positions to be assumed by the edges of masks.

6. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines of the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including at least one mask arranged intermediate the multi-line original and the transparent support plate and means for holding the at least one mask in a predetermined position.

7. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including means defining a line-unblocking slit though which successive lines of the multi-line original appear as the multi-line original is advanced line-by-line across the transparent support plate.

8. The combination defined in claim 7, wherein the means defining the line-unblocking slit comprises at least one mask arranged above the transparent support plate and means for holding the mask in a preselected position.

9. The combination defined in claim 7, wherein the means defining the line-unblocking slit comprises a pair of space masks arranged above the transparent support plate and means for holding the masks in preselected positions.

10. The combination defined in claim 7, wherein the means defining the line-unblocking slit comprises at least one inscribed mask arranged above the transparent support plate and means for holding the mask in a preselected position.

11. The combination defined in claim 7, wherein the breadth of the line-unblocking slit, measured in the transport direction, is such as to expose only one line of the multi-line original at a time.

12. The combination defined in claim 7, wherein the breadth of the line-unblocking slit, measured in the transport direction, is such as to expose at least two lines of the multi-line original at a time.

13. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the advancement mechanism is a step-by-step advancement mechanism operative for effecting the line-by-line transport of the multi-line original in discrete and intermittent steps.

14. The combination defined in claim 13, wherein the step-by-step advancement mechanism comprises an intermittent motion mechanism and electromagnet means operative for activating the intermittent motion mechanism.

15. The combination defined in claim 13, the machine including a cyclically moving part which performs motions correlated with the performance of copying operations, and further including means synchronizing the operation of the step-by-step advancement mechanism with the movements performed by the cyclically moving part.

16. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-tansmitting structure remote from the advancement mechanism for holding the transverse end of a multi-line original to be shifted line-by-line across the transparent support plate, wherein the advancement mechanism comprises a turnable wind-up member and means for turning the wind-up member, and wherein the motion-transmitting structure is at least in part a flexible structure which winds onto the wind-up member as the latter turns.

17. The combination defined in claim 16, wherein the motion-transmitting structure pulls the multi-line original as it winds onto the turning wind-up member.

18. The combination defined in claim 17, wherein the motion-transmitting structure although at least in part a flexible structure is stiff enough that upon reverse turning of the wind-up member the motion-transmitting structure moves out back to its original extended position.

19. The combination defined in claim 18, wherein the motion-transmitting structure is comprised of one part provided with the holding means and an other part connected to the wind-up member, the one part being a rigid plate-like structure and the other part being comprised of at least one flexible belt which when winding onto the wind-up member pulls the rigid plate-like structure, the belt being stiff enough that upon reverse turning of the wind-up member the belt winds off the wind-up member and pushes the rigid plate-like structure back to its original extended position.

20. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the end of the motion-transmitting structure connected to the advancement mechanism is provided with a row of engaging portions, and wherein the advancementmechanism is provided with a corresponding row of engaging portions cooperating with the first row to establish the motion-transmitting connection between the advancement mechanism and the motion-transmitting structure.

21. In combination with an electrostatic or xerographic copying or duplicating machine of the type in which the originals to be copied or duplicated are laid face down upon a transparent support plate to be illuminated by copying light, a transport arragement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including quick-release holding means for holding transparent and opaque plain and inscribed masks in predetermined positions intermediate the multi-line originals and the transparent support plate for each interchange of securely positioned masks.

22. In combination with an electrostatic or xerograhic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the advancement mechanism is located spaced from the transparent support plate end at which it is located, and wherein the motion-transmitting structure extends from the advancement mechanism across the end of the transparent support plate to one end of the multi-line original.

23. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, wherein the advancement mechanism is provided with a housing located alongside the aforementioned end of the transparent support plate, wherein the advancement mechanism is spaced from such end with the motion-transmitting structure extending across such end to one end of the multi-line original when the multi-line original has been advanced only to a certain extent, with the entire motion-transmitting structure and accordingly part of the multi-line original being pulled into the interior of the housing when the multi-line original has been advanced to a greater extent.

24. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including a set of different inscribed and plain masks, means for moving selected masks into copying position relative to the transparent support plate, and means for selecting the masks to be so moved.

25. The combination defined in claim 24, wherein the means for moving selected masks into copying position comprises means for moving the selected masks in direction perpendicular to the transport direction of the multi-line originals.

26. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to a position overlying the transparent support plate; and holding means on the end of the motion-transmitting structure remote from the advancement mechanism for holding the transverse end of a multi-line original to be shifted line-by-line across the transparent support plate, further including a set of different inscribed and plain masks, means for moving selected masks into copying position relative to the transparent support plate, and means for selecting the sequence in which different masks are to be moved into copying position and the number of copies to be made using the different masks in such sequence.

27. The combination defined in claim 26 further including a mask magazine, the set of masks being arranged in the mask magazine.

28. The combination defined in claim 26, the set of different masks being provided side-by-side on an elongated web of mask material.

29. The combination defined in claim 26, wherein the means for moving selected masks into copying position comprises means for moving the selected masks in direction perpendicular to the transport direction of the multi-line originals.

30. In combination with an electrostatic or xerographic copying or duplicating machine of the type in which the originals to be copied or duplicated are laid face down upon a transparent support plate to be illuminated by copying light, a transport arrangement for effecting line-by-line transport of a multi-line original in direction transverse to the direction in which the lines on the multi-line original extend, the transport arrangement comprising an advancement mechanism located at one of the two ends of the transport support plate which extend transverse to the transport direction; a motion-transmitting structure connected to the advancement mechanism and extending from the latter to position overlying the transparent support plate; and holding means on the end of the motion-transmitting structure remote from the advancement mechanism for holding the transverse end of a multi-line original to be shifted line-by-line across the transparent support plate, further including releasable mounting means releasably mounting the transport arrangements on the copying machine alongside the transparent support plate.

* * * * *